Patented June 11, 1940

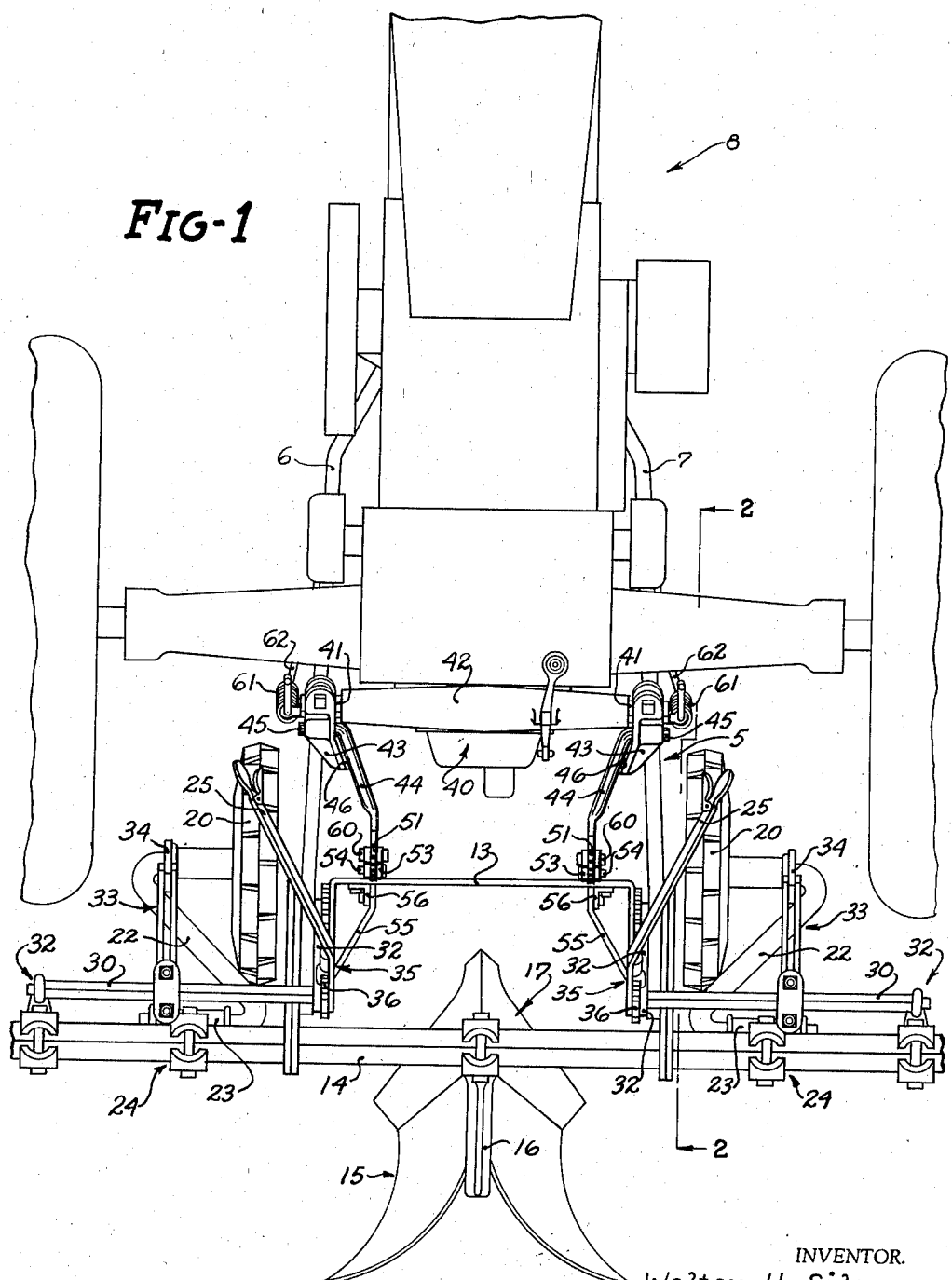

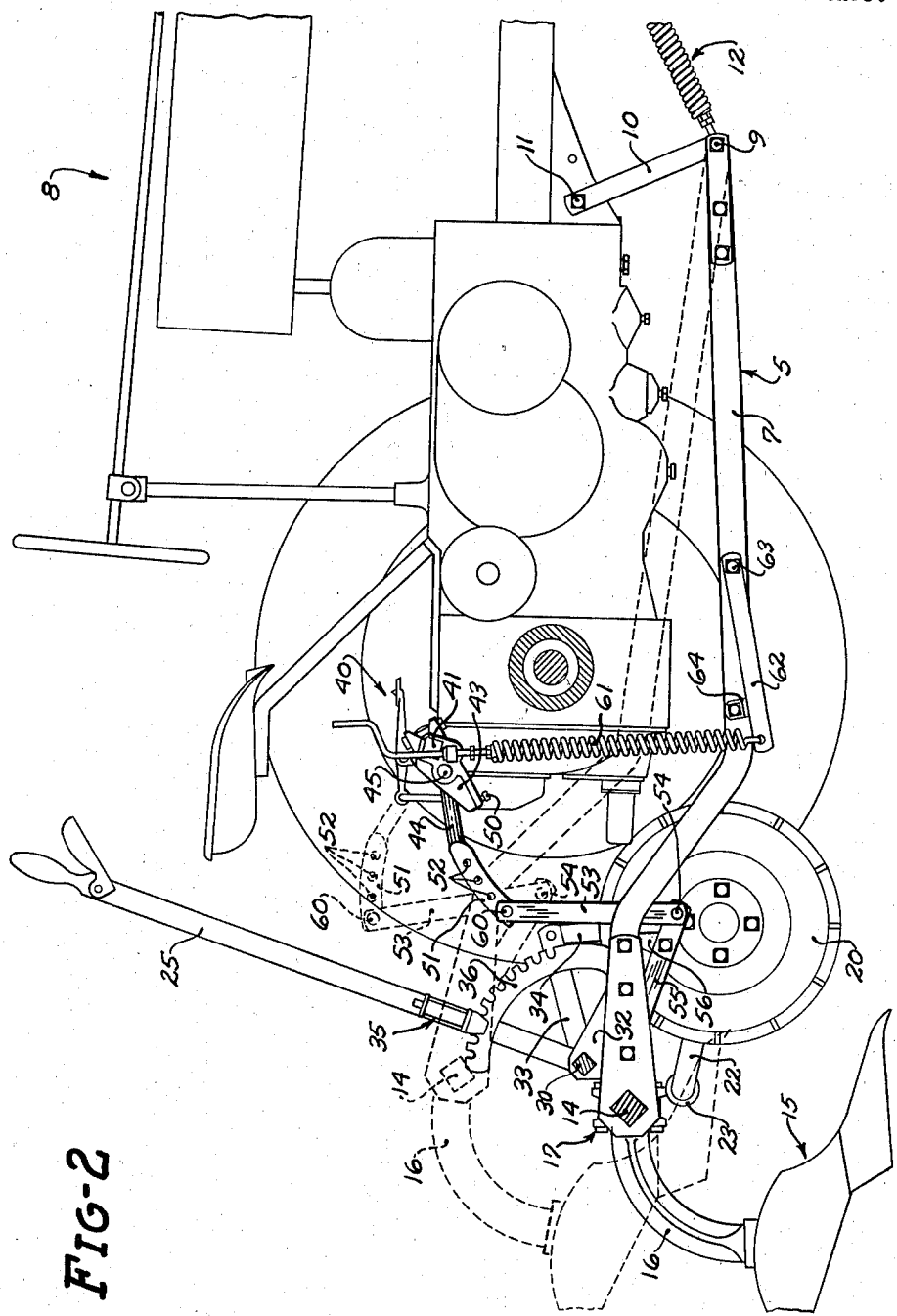

2,203,972

UNITED STATES PATENT OFFICE 2,203,972

LISTER

Walter H. Silver, Moline, Ill., assignor to Deere & Company, Moline, Ill., a corporation of Illinois Application July 28, 1938, Serial No. 221,752

10 Claims. (Cl. 97—50)

The present invention relates generally to agricultural implements and more particularly to lifting connections for implements of the tractor mounted type having a draft frame connected to the tractor for vertical movement and independent depth gauging means, and lifted from ground working position by power lifting mechanism on the tractor. In tractor mounted implements of this kind it is necessary to provide for some lost motion in the lifting connections to permit the implement to follow the undulations of the ground surface under the control of its independent gauging means. It is also desirable that the amount of lost motion be maintained about the same in all settings of the depth gauging means of the implement so that the raising of the implement is started immediately after the lifting operation is initiated by the operator, not only to give the operator more accurate control of the raising of the implement but also, as will appear more clearly hereinafter, to prevent shock loads being imposed on the lifting mechanism. At the same time, all this must be accomplished without causing the implement to be raised too high so as to interfere with the tractor in any setting of the implement draft gauging means.

The object of the present invention is to provide improved lifting mechanism for an implement connected to a tractor for vertical movement and having independent depth gauging means, whereby lifting of the implement is started substantially at the same time and is carried each time to the same height irrespective of the setting of the depth gauging means.

Other objects and advantages of the present invention will appear after a consideration of the following detailed description of the preferred embodiment thereof, reference being had to the appended drawings, in which:

Figure 1 is a plan view of a tractor mounted lister embodying my improved lifting mechanism and Figure 2 is a side view taken substantially along the line 2—2 in Figure 1 and showing in dotted lines the position of the implement in raised or transport position.

Referring now to the drawings, the lister is generally of the type shown and described in detail in my prior Patent No. 2,196,037, issued April 2, 1940, and comprises a draft frame 5 having a pair of spaced fore and aft extending beams 6 and 7 which are disposed beneath a tractor 8 and are pivotally connected at 9 to a hanger 10 swingably supported on the tractor body at 11. The draft beams 6, 7 are further connected to the tractor by means of a yielding hitch device 12 which is also shown in the aforementioned patent. The rear ends of the beams 6, 7 are connected by a U-shaped cross bar 13 and a transverse tool bar 14. The tool bar 14 is adapted to carry a plurality of laterally spaced ground working tools 15, of which only the center one is shown in the drawings. Each of the tools 15 includes an upwardly and forwardly curved standard 16 which is fixed by suitable clamping means 17 to the tool bar 14.

The depth at which the tools 15 operate is regulated by a pair of laterally spaced gauge wheels 20, each of which is journaled on the end of a Z-shaped crank arm 22. The crank arms 22 are swingably supported for vertical swinging in suitable bearing brackets 23 which are clamped to the tool bar 14 by clamps 24. Each of the gauge wheels 20 is raised and lowered by means of a hand lever 25 fixed to a transverse rock shaft 30 which is supported on the beam 14 in suitable bearing means 32. Lifting arms 33 are clamped to the rock shafts 30 and extend forwardly therefrom to a point above the wheel bearing portions of the crank axles 22. A link 34 connects the end of each of the lifting arms 33 with its respective crank axle 22. The hand levers 25 are locked in position by the usual latch mechanism 35 engaging notched sectors 36 fixed to the beams 6, 7, respectively.

The implement is raised from ground working position, shown in solid lines in Figure 2, to transport position, shown in dotted lines, by power lift mechanism indicated generally by the reference numeral 40 which is of a conventional form of the type disposed at the rear of the tractor axle housing and includes a transversely extending rock shaft 41 journaled in a housing 42 and extending laterally from each end thereof. Clamped on each end of the power life rock shaft 41 and extending rearwardly therefrom is a pick-up arm 43, each of which is provided with a lifting arm 44 disposed parallel to the lick-up arm. The inner or forward end of each of the lifting arms 44 has a transversely bent portion 45 which is journaled in the pick-up arm at a point closely adjacent to the rock shaft 41. The outer or rearward end of the pick-up arm 43 is provided with an offset lug 46 which extends laterally under the lifting arm 44 and is adapted to receive a bolt 50 in threaded engagement therewith. The bolt 50 provides an adjustable limit for downward swinging movement of the lifting arm so that the lifting arm 44 is free to swing upwardly relative to the pick-up arm 43 when the latter is in its normal lowered position, as shown in solid lines in Figure 2, but when the power lift rock shaft 41 is rotated in a clockwise direction, the stop bolt 50 engages the lifting arm 44, causing it to swing in unison with the pick-up arm to the position shown in dotted lines. Connecting each of the lifting arms 44 with the implement draft frame 5 is a link 53 which is pivotally connected at 54 with one of two bars 55 that are fixed to the rear ends of the draft beams 6, 7, respectively, and extend forwardly therefrom. Each of the bars 55 is connected to the cross bar 13 by an angle bracket 56.

I have found that when too much lost motion exists between the lifting arm 44 and pick-up arm 43, the power lift mechanism is overloaded and all lifting connections are excessively stressed at the moment of engagement. This is particularly true when a large number of planters are carried on the tool bar 14 and are operating at a shallow depth, as when planting cotton. Therefore, in order to keep the amount of lost motion between the lifting arm 44 and pick-up arm 43 within certain limits for all settings of the depth gauge wheels 20, and at the same time to raise the implement to about the same height irrespective of the depth setting, the outer or rear end of the lifting arm 44 is curved, as at 51, about an arc described by the end of the link 53 rotating about the pivot bolt 54 when the implement is in the raised position shown in dotted lines in Figure 2. The curved portion 51 is provided with a plurality of bolt holes 52 spaced along the length thereof, which are adapted to receive a pivot bolt 60 to connect the link 53 with the lifting arm 44 at any one of the positions thus provided. Since the bolt holes 52 are all equidistant from the pivot bolt 54 in the raised position, the implement will be raised each time to the same height, while in the lowered position the distance from the pivot bolt 54 to the bolt holes 52 varies according to the position of the bolt hole along the length of the arm. Thus, when the operating depth of the tool has been properly adjusted by means of the lever 25, the link 53 may be connected with the lifting arm 44 so as to secure the minimum amount of lost motion in the lifting connections necessary for proper operation of the tool by passing the bolt 60 through the nearest hole 52 in the arm 44 when the latter is lowered.

The lifting force of the power lift mechanism is augmented during the first portion of the lifting stroke while the earth working tool 15 is being torn out of the ground, by a pair of counterbalancing springs 61, each of which is connected at one end to the pick-up arm 43 and at the other end to a lever 62 which is pivotally connected at 63 to the respective draft beams 6, 7, and lifts against a stop 64 on the beam in a manner shown and described in detail in my prior patent.

The operation of the implement is as follows:

When it is desired to plow deep, the gauge wheel 20 is swung upwardly by the hand lever 25 and the link 53 is connected to the lifting arm 44 using one of the outer bolt holes 52. This has the effect of lengthening the link 53, thereby causing the lifting arm 44 to be swung upwardly relative to the pick-up arm 43 to provide a certain amount of clearance between the limit bolt 50 and the pick-up arm 44. In practice I have found that the most satisfactory operation is secured by leaving an angle of 10 or 15 degrees between the lifting arm 44 and the limit bolt 50, as this is sufficient to permit ample vertical movement between the implement and the tractor as they travel over uneven ground and yet prevent the implement from hanging on the rock shaft. At the same time, the lifting arm 44 is engaged by the limit bolt 50 within the first 10 or 15 degrees of rotation of the pick-up arm 43 when the power lift is actuated by the operator, and the implement is raised to an elevated transport position sufficiently high to clear the ground.

To plow shallow, the gauge wheel 20 is swung downwardly to the desired extent, raising the draft frame 5 and tool 15. The link 53 is accommodated to the shorter distance now existing between the draft frame and rock shaft 41, by connecting the link to the lifting arm 44 using one of the bolt holes 52 at the inner end of the curved portion 51, toward the pivot 45. This swings the lifting arm 44 downwardly to about the same position relative to the limit bolt 50 as in the deep plowing setting, and the lifting arm 44 is engaged by the pick-up arm 43 within the first 10 or 15 degrees of rotation of the latter, as before. Also, the implement is raised to the same elevated transport position as in the deep plowing setting since the length of the link 53 is the same, and all of the bolt holes 52 are equidistant from the pivot holt 54 in the raised position.

What I claim as my invention is:

1. In combination with a tractor having power lift mechanism including an actuating rock shaft, an implement having a ground working tool, draft means connecting said implement to said tractor for vertical movement, gauge means for regulating the working depth of said tool, an arm carried on said rock shaft and adapted to swing upwardly with rotation thereof, said arm being unrestricted against upward swinging during ground working operation, link means connected with said implement and disposed substantially perpendicular to said arm when the latter is raised, and means for connecting said link means with said arm at a plurality of points spaced along said arm.

2. In combination with a tractor having power lift mechanism including a transverse rock shaft, an implement having a ground working tool, draft means connecting said implement to said tractor for vertical swinging, gauge wheel means carried on said implement for regulating the working depth of said tool, a pick-up arm rigidly fixed on said rock shaft and swingable vertically with rotation of said shaft, a lifting arm adapted for swinging movement with respect to said pick-up arm, said pick-up arm being adapted to engage said lifting arm to swing the latter in one direction when said rock shaft is rotated, a link, means for pivotally connecting said link to said implement, and means spaced equidistant from said last named means when said arm is raised for connecting said link to said lifting arm.

3. In combination with a tractor having power lift mechanism including a transverse rock shaft, an implement having a ground working tool, draft means connecting said implement to said tractor for vertical swinging, gauge wheel means carried on said implement for regulating the working depth of said tool, a pick-up arm rigidly fixed on said rock shaft, a lifting arm pivotally connected to said pick-up arm, a stop on said pick-up arm engageable with said lifting arm to limit the pivotal movement of the latter in one direction, a link, a pivot connecting said link with said implement, and a plurality of pivot connections disposed along said lifting arm substantially equidistant from said first named pivot when the lifting arm is raised for connecting said link thereto.

4. In an implement comprising a supporting frame, a ground working tool connected therewith for vertical movement between operating and transport positions, and means for regulating the working depth of the tool, an arm supported on said frame for vertical swinging, lifting connection between said arm and said tool providing a limited amount of lost motion therebetween when the tool is in operating position, said lifting connection comprising link means, a pivot bolt connecting said link means with the tool, and means adjustable along the length of the arm for connecting said link means therewith, said arm being curved to form an arc about said pivot means as a center when in raised position, whereby the amount of lost motion in said lifting connection can be maintained substantially constant and the tool raised to the same transport height for all depth adjustments of the tool.

5. In an implement comprising a supporting frame, a ground working tool connected therewith for vertical movement between operating and transport positions, and means for regulating the working depth of the tool, an arm supported on said frame for vertical swinging, lifting connection between said arm and said tool providing a limited amount of lost motion therebetween when the tool is in operating position, said lifting connection comprising link means, a pivot bolt connecting said link means with the tool, and means for connecting said link means to the arm at any of several points spaced equidistant from said pivot bolt when the arm is raised, said several points being spaced at varying distances from the pivot bolt when the arm is lowered.

6. In an implement comprising a supporting frame, a ground working tool connected therewith for vertical movement between operating and transport positions, and means for regulating the working depth of the tool, an arm supported on said frame for vertical swinging, lifting connection between said arm and said tool providing a limited amount of lost motion therebetween when the tool is in operating position, said lifting connection comprising link means, a pivot bolt connecting said link means with the tool, said arm having a plurality of holes arranged in an arc described about said pivot bolt when the arm is raised, and means engageable with said link and with any one of said holes for connecting the link to said arm.

7. In combination, an implement frame, a tool connected with the frame for vertical movement between operating and transport positions, means for regulating the operating position of said tool with respect to the surface of the ground, a lifting rockshaft journaled on said frame, a pick-up arm fixed to said rock shaft and swingable vertically with rotation thereof, a lifting arm pivoted for swinging movement with respect to the pick-up arm, said pick-up arm being adapted to engage said lifting arm to swing the latter upwardly therewith, a link member, a pivot bolt connecting said link member with said tool, and means for connecting said link member to said lifting arm at any of several points spaced equidistant from said pivot bolt when the arm is raised, said several points being spaced at varying distances from the pivot bolt when the arm is lowered.

8. In combintion with a tractor having power lift mechanism including an actuating rock shaft, an implement having a ground working tool, draft means connecting said implement to said tractor for vertical movement, lifting connection between said rock shaft and said implement for raising the latter to transport position when the rock shaft is rocked in one direction and providing a limited amount of lost motion when the implement is in working position, said lifting connection including link means pivotally connected at one end with the implement, an arm carried on said rock shaft and adapted to swing upwardly with rotation thereof, said arm having a curved portion arcuate about said one end of the link when the arm is raised, and means shiftable along said curved portion of the arm for connecting the other end of said link means with the arm.

9. In combination with a tractor having a power lift mechanism including an actuating rock shaft, a tool carrying frame connected with the tractor for vertical movement between working and transport positions, a pick-up arm fixed to said rock shaft and swingable vertically with rotation thereof, a lifting arm pivoted for swinging movement with respect to the pick-up arm and engageable thereby when the pick-up arm swings upwardly, a link, means pivotally connecting the link with said implement, and means for connecting said link to said lifting arm at any of several points arranged along an arc described about said pivotal connecting means as a center when the arm is raised.

10. In combination with a tractor having power lift mechanism including a rock shaft, an implement having a ground working tool, draft means connecting said implement to said tractor for vertical swinging, a pick-up arm rigidly fixed on said rock shaft, a lifting arm pivotally connected to said pick-up arm, a stop on said pick-up arm engageable with said lifting arm to limit the pivotal movement of the latter in one direction, a link, a pivot bolt connecting one end of said link with said implement, and a second pivot bolt connected with the other end of said link, said lifting arm having a plurality of bolt holes arranged in an arc described about said first named pivot bolt as a center when the arm is raised and adapted to receive said second pivot bolt.

WALTER H. SILVER.